April 9, 1935.    G. R. ERICSON ET AL    1,996,912
LUBRICATING SYSTEM
Filed July 5, 1929    5 Sheets-Sheet 1
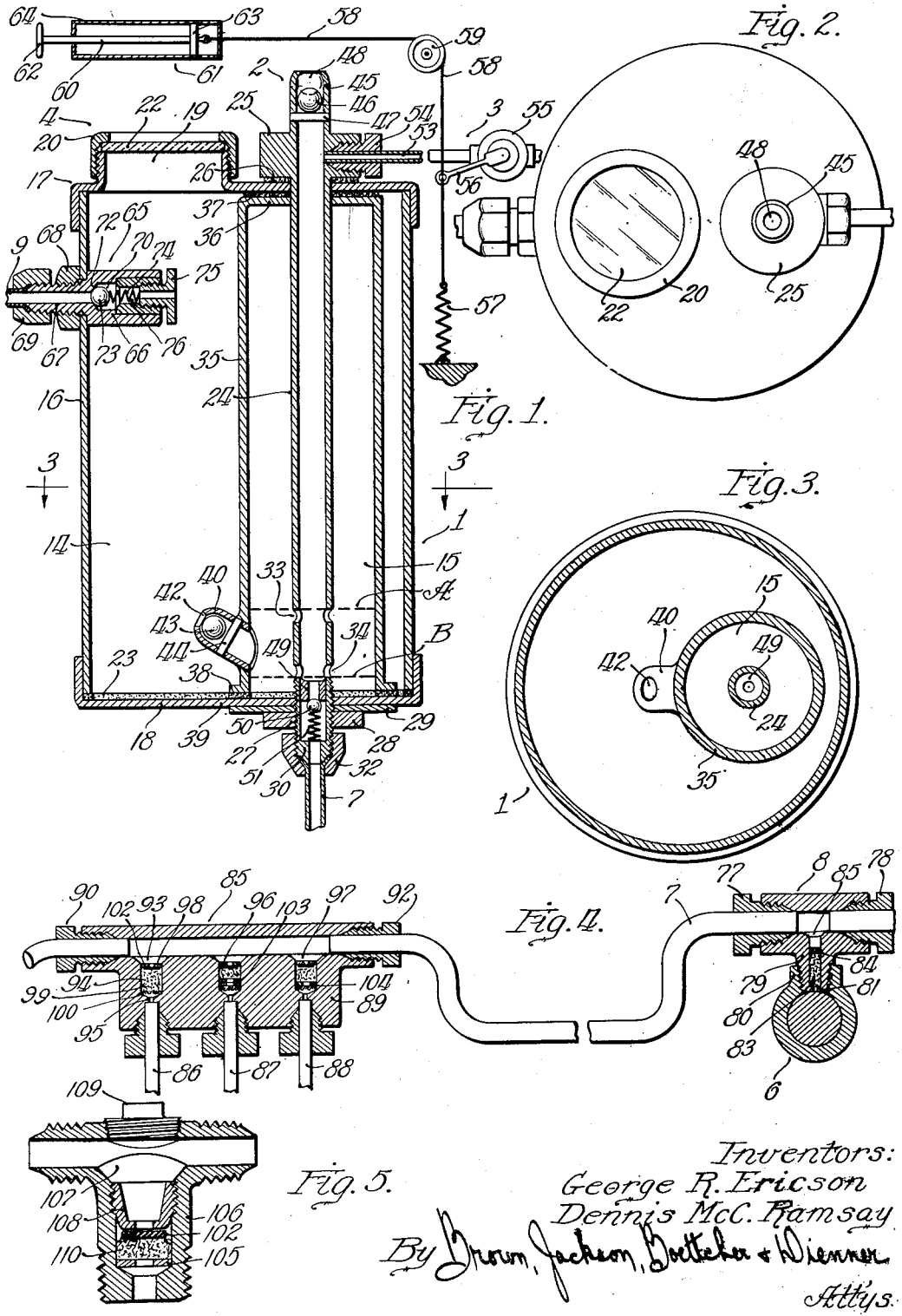
Inventors:
George R. Ericson
Dennis McC. Ramsay
By Brown, Jackson, Boettcher & Dienner
Attys.

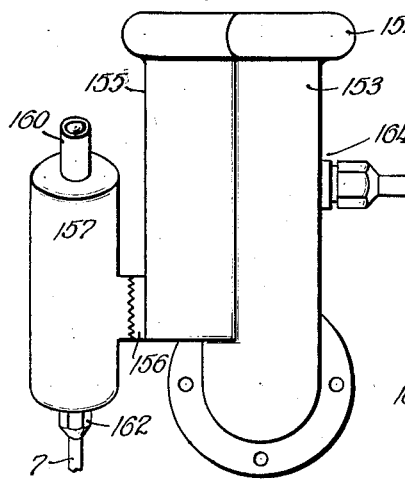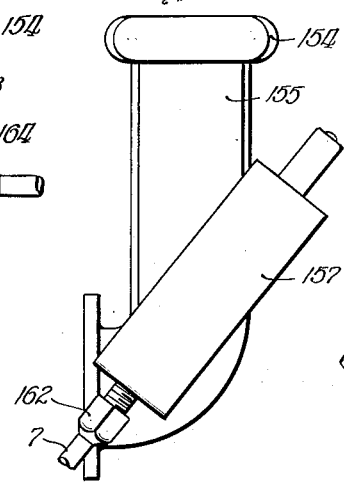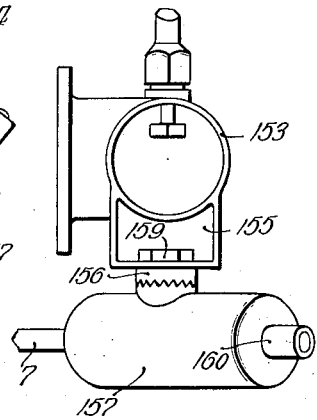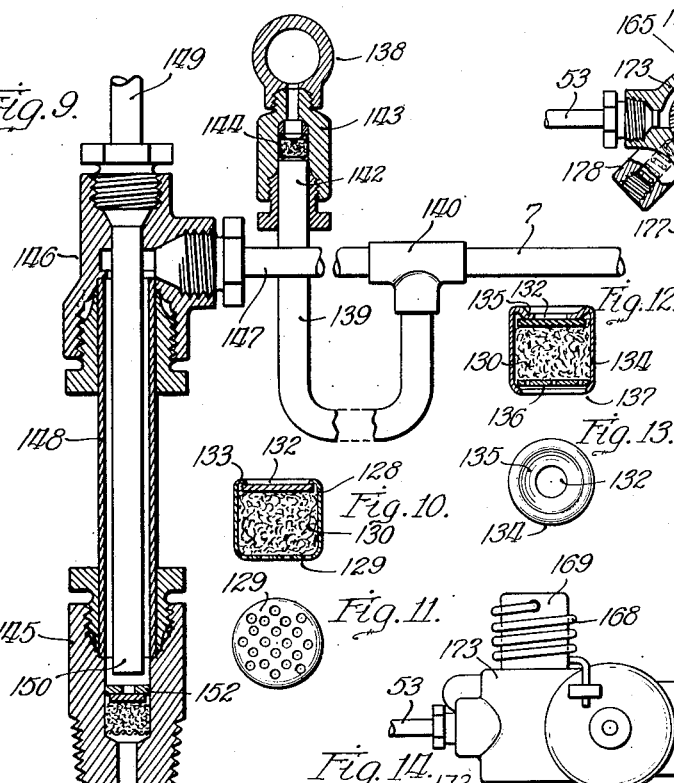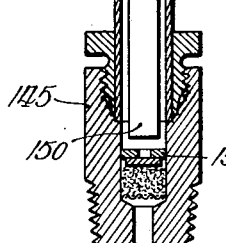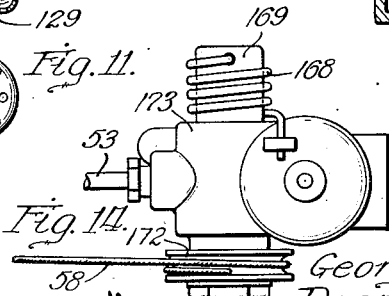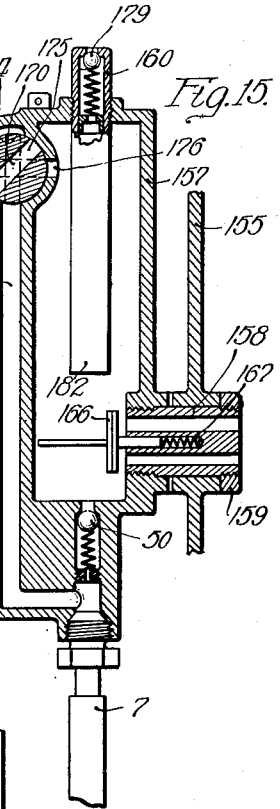

April 9, 1935.  G. R. ERICSON ET AL  1,996,912
LUBRICATING SYSTEM
Filed July 5, 1929   5 Sheets-Sheet 3
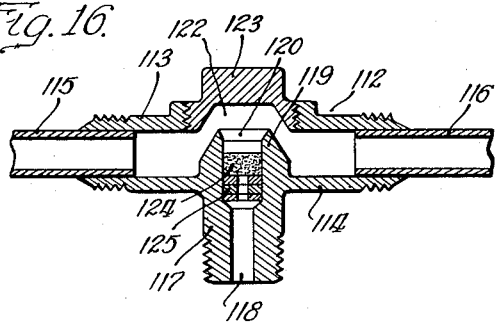
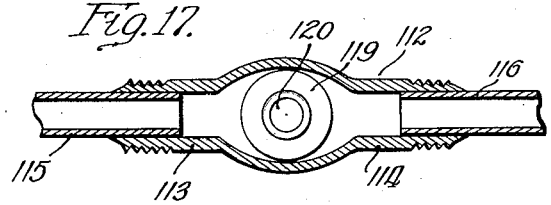
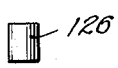 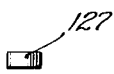
Inventors:
George R. Ericson
Dennis McC. Ramsay
By Brown, Jackson, Boettcher & Dienner
Attys.

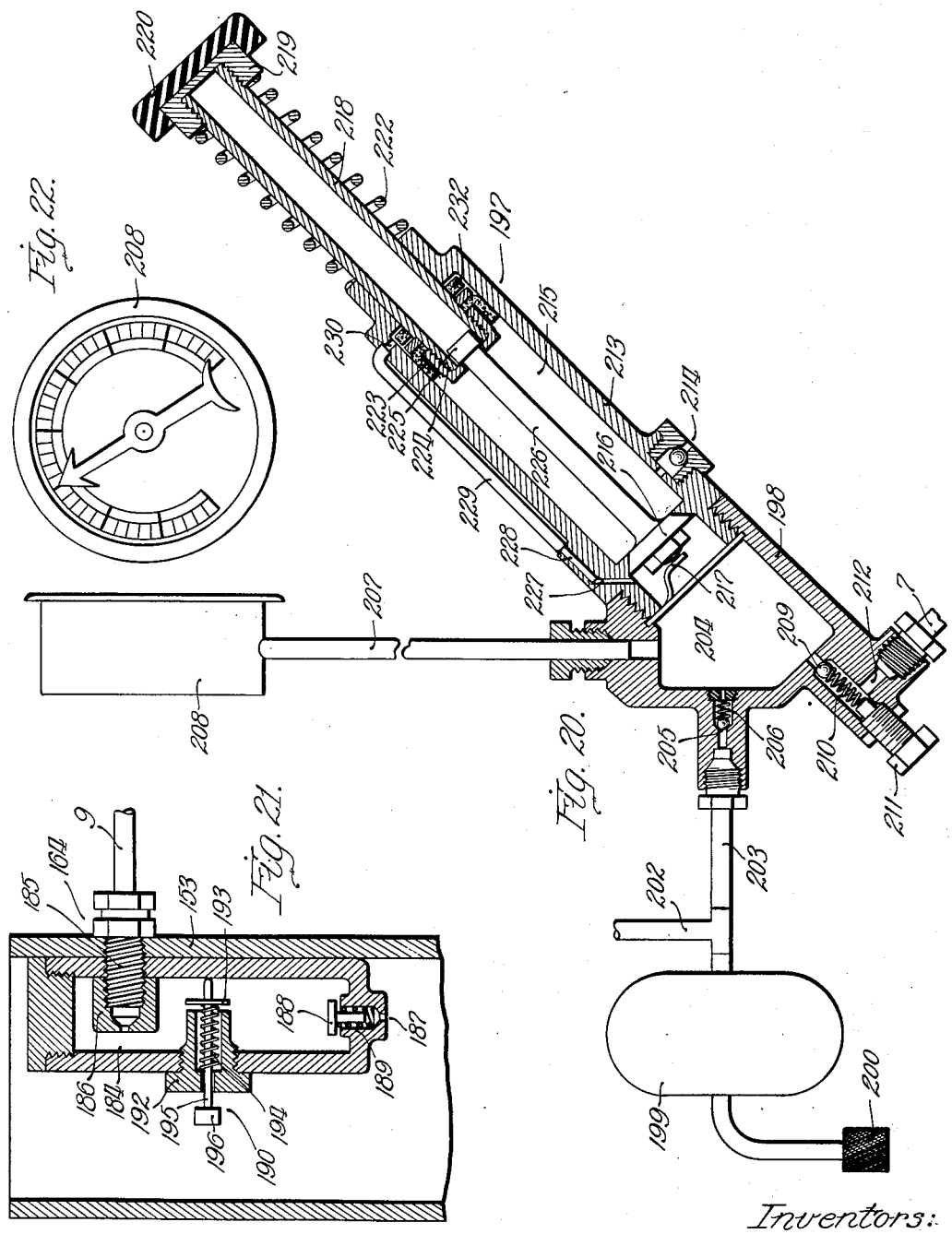

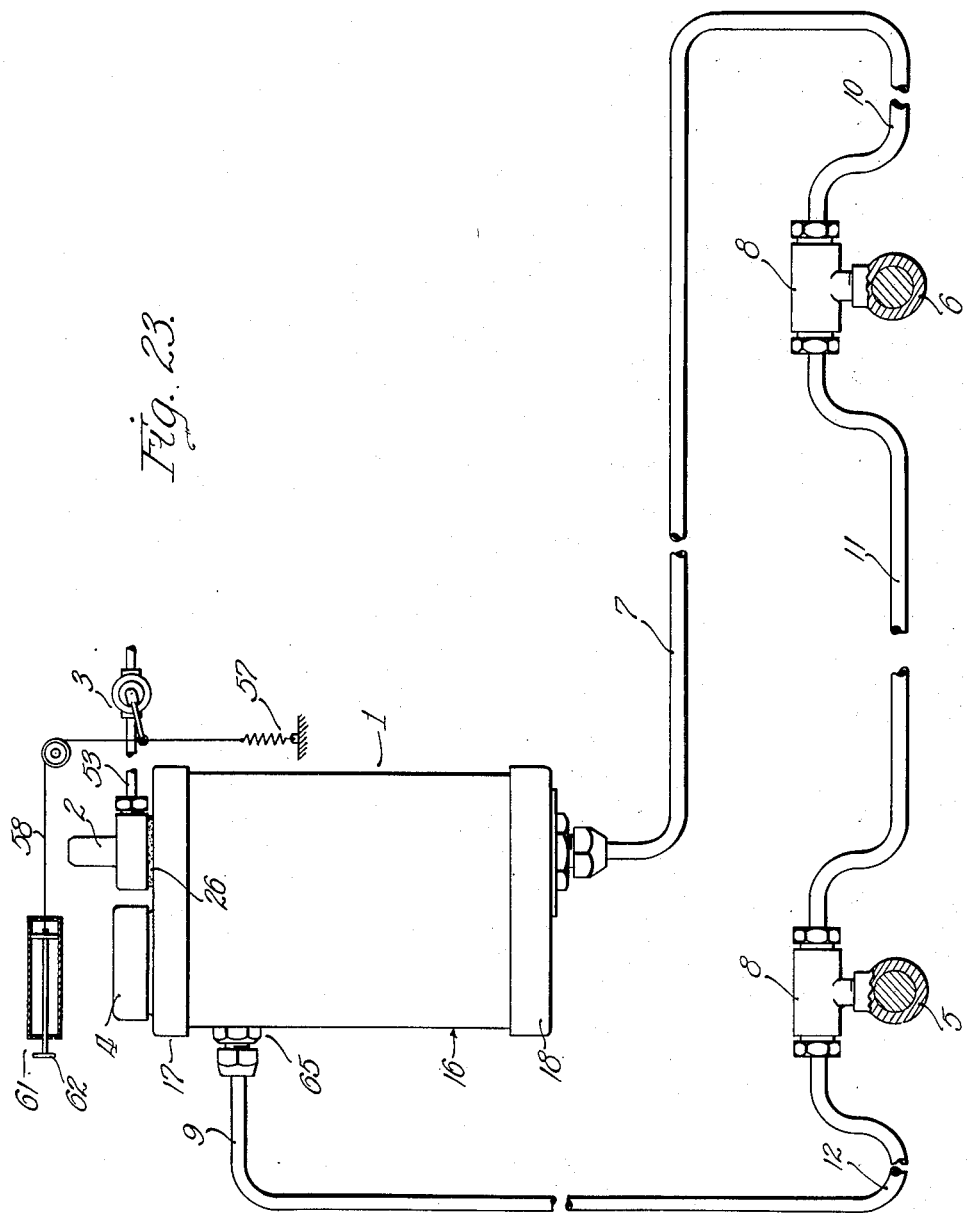

Patented Apr. 9, 1935

1,996,912

UNITED STATES PATENT OFFICE 1,996,912

LUBRICATING SYSTEM

George R. Ericson, St. Louis, Mo., and Dennis McC. Ramsay, Alexandria, Va., assignors, by mesne assignments, to Stewart-Warner Corporation, Chicago, Ill., a corporation of Virginia Application July 5, 1929, Serial No. 376,175

17 Claims. (Cl. 184—7)

The present invention relates to lubricating systems. The system of our invention is applicable to automotive work, more particularly to the lubrication of the chassis bearings of vehicles. While the invention is specifically described in connection with the lubrication of the chassis of an automobile, it is to be understood that the invention may equally well be applied to the lubrication of stationary machinery and grouped under the general designation of industrial lubrication.

The present system is particularly applicable to the distribution of a fluid lubricant, namely, oil, to the various bearings of an automobile or machine, or the like, by a single operation.

According to our invention, a charge of oil is segregated from a source of oil supply, and this charge of oil is then driven in succession to the various bearings, or in proximity thereto, and separate doses of oil for the bearings are retained at the bearings, the surplus of the charge being returned either to the source of oil supply or otherwise discharged from the system. The separate doses of oil are then forced into the bearings which they are to lubricate, to complete the operation.

The propulsion of the charge of oil is preferably performed by a pneumatic pressure. The doses of oil for the individual bearings are preferably metered out by volumetric measurement. Such excess of the charge of lubricant as does not adhere to the walls of the conduit through which the charge is conveyed is driven out of the conduit system by the pneumatic pressure which is employed, and such part of the charge as adheres to the walls of the conduit is drained away from the measuring chamber, space being provided in which such drained oil may be trapped and retained, either by depressing (that is, bending downwardly) the pipe between the bearings, or arranging the tops of the dose measuring chambers above the run of the conduit or otherwise.

This arrangement frees the system of excessive draining of oil into bearings, leakage of oil at leaky fittings between operations, or maloperation of the system due to the entry of air, such as occurs in known systems.

The main object of the present invention is to provide a lubricating system and method particularly useful for centralized lubrication of automotive or other machines, characterized by positive and reliable delivery of oil from a central source to each of a number of bearings.

Another object of our invention is to provide a centralized system of lubrication in which separate doses of oil are first measured out and then positively discharged to each of the bearings.

Another object of our invention is to provide a system of centralized lubrication which will supply predetermined quantities or doses of oil to each of the bearings, regardless of the distance of the bearings from the source, the relative height of the bearings, or the relative resistance offered by the bearings.

Another object of the invention is to provide a system of centralized lubrication in which a conveying conduit extending to the various bearings to be lubricated forms traps or draining chambers into which the oil adhering to the side walls of the pipe may be drained.

Another object of the invention is to provide separate metering units for each of the bearings, for metering by volumetric displacement definite quantities of oil to be supplied to the bearings for each operation.

Another object of the invention is to provide a metering unit which shall combine the volumetric metering function with resistance to flow whereby all of the units will discharge their doses of oil to the corresponding bearings in substantially the same period of time.

Another object of the invention is to provide metering units of the volumetric displacement type which may be employed for bearings above or below the pipe line system.

Another object of the invention is to provide a centralized lubricating system, in which the by-passing or escape of oil during the distributing period is minimized. Another object of the invention is to provide a system in which the oil is distributed through a conduit which is never entirely filled with oil and wherein the measurement of the doses for each bearing is secured by volumetric displacement.

Another object of our invention is to provide a system which will secure progressive lubrication of the several bearings. While the oil reaches the various bearings in succession, the actual forcing of oil into the bearings is substantially simultaneous so that the air pressure which forces the doses of oil into the various bearings will not escape at one bearing before it has forced the doses, measured out for the other bearing, into such other bearings.

Another object of the invention is to provide a system which will give a signal or indication that the operation of lubrication has been completed and that all of the bearings have been provided with their separate doses of oil.

Another object of the invention is to provide timing means for controlling the application of pneumatic pressure to the charge measuring chamber.

Another object of the invention is to provide means for permitting the discharge of the excess of oil of each charge at the remote end of the pipe line system while retaining the compressed air in the pipe line system to discharge the doses of oil into the bearings.

Another object of the invention is to provide a source of oil supply in combination with the engine lubricating system. Preferably this phase of the invention contemplates a supply chamber which is filled with oil when the oil in the crank case is changed or additional oil poured thereinto.

Another object of the invention is to provide means for preheating the pipe line system to increase the fluidity of the oil.

Another object of the invention is to provide a centralized lubricating system which may be operated by the application of the usual compressed air tire hose thereto.

Another object of the invention is to provide a centralized system of lubrication which may be operated by pressure derived from the engine cylinders.

Another object of the invention is to provide a device for metering out a definite charge of oil to be forced through the distributing conduit to the bearings and the excess thereof returned to the main source of oil supply.

Another object of the invention is to provide means in conjunction with the lubricating pump of the engine for providing a charge of lubricant to be driven through the distribution conduit.

Another object of the invention is to provide manually operable means for supplying a suitable charge of air or gas under pressure to the lubricating system.

Another object of the invention is to provide an improved form of manually operated air pump for forcing the charge of lubricant through the distribution conduit.

Another object of the invention is to utilize the usual pressure lubricating gage employed in conjunction with the oiling system of the engine for indicating the operation of the lubricating system of our invention.

Another object of the invention is to provide a novel form of distribution conduit having bends therein for trapping oil adhering to the walls of the pipe line system, these bends facilitating the application of the separate length of pipe to the metering unit.

Another object of the invention is to provide an improved form of check valve and resistance unit for each of the dose measuring chambers.

Another object of the invention is to provide a novel form of fitting for each of the dose measuring chambers at the bearings which will drain oil away from the measuring chambers without requiring bends in the pipe line system.

Another object of the invention is to provide a control valve at the return end of the pipe line system which will permit the return of the excess lubricant of each charge to the source of oil supply, but will retain the compressed air or other gas under pressure in the pipe line system.

This valve is preferably arranged to hold the gas pressure until it drops to a predetermined value and then release the same to facilitate the discharge of the excess of lubricant back to the source of oil supply. The opening of this return valve gives a signal or indication, by the escape of the charge of gas therethrough, that the operation of lubricating the bearings has been completed.

Another object of the invention is to prevent oil from running from the measuring chamber into the distribution conduit except when air pressure is applied to the measuring chamber.

Another object of the invention is to provide means at each end of the pipe line system for trapping compressed air or gas during the operation of forcing lubricant into the bearings. After the operation of forcing oil into the bearings is completed, the pressure is released preferably at both ends of the conduit system to permit the charge measuring chamber to be filled with oil.

Other objects of our invention will become apparent from the following specification and claims:—

Now, in order to acquaint those skilled in the art with the manner of constructing and operating a device embodying our invention, we shall describe, in connection with the accompanying drawings, a specific embodiment of the invention.

In the drawings:—

Fig. 1 is a vertical, longitudinal section through the oil supply chamber and the charge measuring chamber which comprises the main reservoir unit;

Fig. 2 is a top plan view of the same;

Fig. 3 is a section taken on the line 3—3 of Fig. 1;

Fig. 4 is a side elevational view of a part of the pipe line system showing two of the metering units in section;

Fig. 5 is a longitudinal cross section of a modified form of metering unit;

Fig. 6 is a front elevational view of a modified form of main reservoir units built into the oil filler pipe of an automobile engine;

Fig. 7 is a side elevational view of the same;

Fig. 8 is a top plan view of the same with the cap or cover removed;

Fig. 9 is a side elevational view with parts in section showing the manner of supplying oil to a bearing located below and a bearing located above the run of the pipe line system;

Fig. 10 is a vertical section of a resistance unit;

Fig. 11 is a bottom plan view of the same;

Fig. 12 is a similar vertical section of a modified form of resistance unit;

Fig. 13 is a plan view of the same;

Fig. 14 is a top plan view of a modified form of inlet valve for compressed gas;

Fig. 15 is a vertical section through a modified form of charge measuring chamber and pressure applying valve;

Fig. 16 is a longitudinal vertical section through a modified form of metering unit and its pipe connection;

Fig. 17 is a horizontal sectional view of the same showing the dose measuring chamber in plan view;

Fig. 18 is a side elevational view of a modified form of filler for the dose measuring chamber;

Fig. 19 is a similar view of a different size slug for the same;

Fig. 20 is a vertical longitudinal section through a modified form of charge measuring chamber and manually operated air pump which may be employed in connection with our invention;

Fig. 21 is a vertical section through a modified form of return valve;

Fig. 22 is a face view of the pressure gauge which may be employed in connection with the form shown in Fig. 20; and Fig. 23 is an elevation of a lubricant distributing system embodying the charge-measuring chamber of Fig. 1, parts thereof being diagrammatically illustrated.

We shall describe herein three typical systems, all embodying our invention, although it is to be understood that the invention is not to be limited to these forms, but may be embodied in various forms.

(a) A lubricating system employing an oil reservoir unit adapted to be mounted on the dash of the vehicle and provided with alternative air supply means consisting of either a connection for a tire filling air hose, or of a connection leading to a cylinder of the engine which is automatically closed after having been manually opened.

(b) A lubricating system employing a modified form of oil supply reservoir and charge measuring chamber to be employed in conjunction with a crank case filler and having, as pressure fluid supply means, either a tire filling air hose connection or, in slightly modified form, the charge measuring chamber is provided with a pressure fluid supply from the engine cylinder permitting heating up of the pipe line system.

(c) A lubricating system employing a manually operated air supply device consisting of a foot operated pump, a measuring chamber supplied with lubricant directly from the engine oil pump and having the return valve leading into the breather pipe or other means communicating with the crank case from which the engine lubricating pump draws lubricant.

Each system embodies the following main elements:
(1) A source of oil supply.
(2) A charge measuring chamber.
(3) A source of air or other gas under pressure.
(4) A distributing conduit.
(5) Dose measuring chambers at each of the bearings.
(6) A return valve.

Each of the above elements is capable of modification within our invention, and we have disclosed herein various forms of the elements.

In each embodiment of the invention herein shown, we displace a charge of oil by pneumatic pressure from a charge measuring chamber which is fed from a suitable source of oil supply. The source of oil supply is cut off during the discharge period of the charge measuring chamber.

The charge measuring chamber is cut off from the distribution conduit between periods of displacement. The charge measuring chamber segregates a charge of lubricant which is intended to be slightly in excess of the combined doses measured out by the dose measuring chambers at the bearings in the distribution and discharge function of the system. It is a characteristic of the operation of our system that the distributing conduit is never completely filled with oil and, second, that there is an actual volumetric measuring of the dose of oil for each bearing.

The charge of oil which is displaced from the charge measuring chambers is propelled by pneumatic pressure through the distributing conduits and successively fills the dose measuring chambers of the bearings one after the other. The pneumatic pressure is trapped in the charge measuring chamber and follows the charge of oil out of the same into the distributing conduit to distribute the oil to the separate measuring chambers for each of the bearings, then to drive the excess out of the pipe line system, the pneumatic pressure being trapped in the conduit and serving to force the separate doses of oil at the metering units into the bearings under pneumatic pressure until the pressure has dropped to a predetermined value, whereupon it is released at one or both ends of the distribution conduit, allowing the charge measuring chambers to be refilled and permitting the excess of lubricant, where the same has been trapped at the return end, to be released into the source of oil supply.

The communication between the dose measuring chambers of the bearings and the bearings themselves is in each case sufficiently restricted to prevent any substantial flow during the period of propelling the charge of oil through the distribution conduit, this action occurring very rapidly. The continued application of the trapped pneumatic pressure forces the separate doses into the bearings through the restriction in the said connection.

Referring first to Fig. 23, where we have shown, diagrammatically, an embodiment of the invention, the main oil reservoir unit I has an air supply connection 2, or an alternative air supply connection 3. A filler cap 4 is provided for charging the reservoir unit I with oil. A plurality of bearings, such as 5—6, of which there may be any suitable number, are adapted to be supplied with lubricant from the reservoir unit I through a distributing conduit 7 which leads from the bottom of the oil supply reservoir I to the lubricating units 8—8 in series and then extends back, as indicated at 9, to the reservoir unit I.

It will be observed that the pipe 7, which forms a distributing conduit, has depressed portions such as 10, 11 and 12 on each side of the lubricating units 8 for the purpose later to be described, but broadly designated as draining the excess lubricant from the walls of the distribution conduits away from the lubricating units 8—8.

We shall now describe the construction of the reservoir unit I, this unit being shown in Figs. 1, 2 and 3:—

Reservoir unit

The reservoir unit 1 comprises two main portions, namely, the oil supply chamber 14 and the charge measuring chamber 15.

The oil supply chamber comprises the cylinder member 16 provided with the heads 17 and 18, at top and bottom respectively, these parts being secured together in any suitable manner. The top head member 17 is provided with a filler neck 19 normally closed by a cap member 20 having a glass plate 22 permitting a view of the interior of the chamber 14.

A gasket of cork or the like, indicated at 23, is interposed between the bottom end of the cylinder 16 and the lower head 18 to make a tight joint. The heads 17 and 18 are held upon cylinder 16 in the present embodiment by the tubular tie-rod member 24, which has also a pneumatic and hydraulic function. The upper end of the tubular member 24 is provided with a head 25 which bears through a gasket 26 upon the head 17 of the cylinder 16. At its lower end the tubular member 24 extends through an opening in the bottom head 18 and the threaded lower end of the same has a clamping nut 28 which bears against a sealing plate 29 forming a seal between said nut 28 and the bottom head 18. The extreme end of the tubular member 24 is provided with a tapered seat 30 for the coupling of the distributing conduit 7. The distributing conduit 7 has a conically flared portion resting against the conical seat 30 and held in engagement by the coupling nut 32.

The tubular member 24 has openings 33 at one level and openings 34 at the lower level, these levels being indicated by reference letters A and B,—the level A lying at the top of the openings 33 and the level B lying at the bottom of the openings 34.

The charge measuring chamber 15 is formed of a cylinder member 35 having an integral head member 36 perforated to pass the tubular member 24, a gasket 37 lying between the head 36 and the head 17 to form a fluid tight joint. At the bottom the cylinder member 35 is provided with a flange 38 which seats through the gasket 39 upon the bottom head 18 of the main cylinder 16.

The measuring chamber 15 has an inlet connection 40 secured in the walls thereof adjacent the bottom, and this inlet connection has an inlet port 42 controlled by a ball check valve 43. The connection 40 is placed on an inclination to permit the valve 43 to recede by gravity from the inlet port 42, this ball 43 being held in place adjacent the port 42 by the pin 44.

The upper end of the tubular member 24 comprises a nipple 45 to which an air hose, such as is usually employed for inflating tires, may be applied.

Within the nipple 45 there is disposed the ball check valve 46 held in place by the pin 47 away from the valve port 48 which forms the inlet port for pressure fluid, namely, compressed air.

The ball 46 fits closely enough within the nipple 45 that when the pressure in the tubular member 24 exceeds outside pressure the ball 46 will be driven to its seat, closing the inlet port 48.

The lower end of the tubular member 24 has a check valve seat member 49 disposed therein below the discharge opening 34, and a ball check valve 50 held by a spring 51 normally seats against the valve seat member 49 to prevent the escape of lubricant from the measuring chamber 15. The spring 51 may be easily overcome by internal pressure to force out oil, as will be described later.

The alternative means 3 for supplying compressed air or compressed gas to the charge measuring and displacement chamber 15 is shown as a pipe 53 connected into the bore of the tubular member 24 through the coupling 54 secured in the head 25 of the said tubular member. A shut-off valve 55 is provided with an operating arm 56, connected on the one side to the spring 57 through a suitable wire or cord, and connected on the other side to an operating cord or wire 58. The valve, as shown, is in the closed position, but when the arm 56 is swung upwardly the valve is opened permitting compressed air from a suitable source of supply to be admitted to the bore of the tubular member 24. The valve 55 may be connected to an engine cylinder so that the compression and explosion strokes of the engine may supply the compressed gas for operation of the charge measuring and displacement chamber 15.

The wire 58 is led over a pulley 59 and is connected to a pull rod 60 having the pull handle 62. The pull rod 60 has a plunger provided with a cup leather 63 playing in a cylinder 64 to provide a timing element. When the operator pulls on the pull handle or button 62, thereby drawing up on the cord 58 and opening the valve 55 to admit compressed air or gas from the engine cylinder or other suitable source of supply, the spring 57 will tend to close the valve, but to do so it must pull the plunger 63 through the cylinder 64, and sufficient resistance is provided to the escape of air from the cylinder 64 to provide the necessary time interval for the charge of compressed gas to be accumulated in the top of the charge measuring chamber 15. This charge measuring chamber has the dual function of measuring out a charge of liquid from the reservoir chamber 14 and also of trapping a charge of compressed gas above the level A.

The oil reservoir chamber 14 is connected to the return end of the distribution conduit 7, the end 9 of said conduit being connected through a return valve 65 to the interior of the chamber 14. The return valve comprises a valve body 66 having a stud 67 extending through the side walls of the cylinder member 16 and locked in place by a nut 68. The pipe coupling 69 connects the end of the distributing pipe to the stud 67 in a well known manner. The return valve body 66 contains a chamber 70, at one end of which there is a valve seat 72 for the ball valve 73, this ball 73 being held toward its seat 72 by means of a light spring 74 adjusted by the hollow screw 75.

At the opposite end of the chamber 70 there is a bore 76 in which the ball 73 fits relatively closely to form a high resistance to the flow of fluid past the same, for the purpose of trapping air in the distribution conduit, as will be explained later.

We shall now describe the pipe line or distributing conduit with the lubricating unit. As explained in connection with Fig. 23, each of the several bearings, such as 5—6, is provided with a fitting, such as 8, comprising, in general, a T-shaped body with couplings, such as 77 and 78 as shown at the right of Fig. 4, for coupling parts of the distribution conduit 7, which may be copper tubes of the order of 3/16ths of an inch or 1/4th of an inch inside diameter. This conduit should be large enough to permit the interchange by gravity of air and oil in opposite directions. The distributing conduit is disposed in a loop, beginning with the connection at the bottom of the oil reservoir unit and returning to the return valve. The inlet to the pipe line system is from the measuring chamber which forms a part of the unit 1, and the outlet discharges the surplus oil through the return valve back into the oil reservoir contained in the unit 1. Between the lubricating units the pipe line is depressed to permit the oil to run away from the measuring chambers in the lubricating units so that they will receive only the predetermined doses of oil measured out by the dose measuring chambers in the fittings, such as 8—8. As shown in the unit 8 at the right of Fig. 4, the vertical leg 79 is screwed into a screw socket 80 in the bearing 6.

This vertical leg has a relatively small outlet passageway 81 into the bearing, and above this there is a chamber in which the felt plug 83 is contained, and above the felt plug there is contained the metal plug 84 having a restricted passageway therethrough. Above the metal plug 84 there is the measuring chamber 85 which is filled by gravity from the body of oil or charge of oil which is discharged from the charge measuring chamber 15 for each operation.

At the left of Fig. 4 we have shown a connected unit 85 having three separate dose measuring chambers for three separate bearings, the bearings being supplied through pipes 86, 87 and 88 coupled by suitable compression couplings to the bottom of the body 89 in which the dose measuring chambers are formed. This body 89 is a generally T-shaped member having the couplings, such as 90 and 92 for connecting adjacent ends of pipe sections, these pipe sections being depressed, as previously explained, between lubricating units. The first lubricating measuring chamber 93 is shown as comprising a definite recess, the upper end of which is flared out to provide the measuring chamber. Below the flared portion 93 there is a cylindrical bore 94 terminating in a reduced outlet opening 95. The recesses comprising the flared portions and cylindrical portions are preferably all alike and are formed by drilling, plugs being provided above the same, these plugs being omitted for the sake of clearness.

In the first unit shown at the left of Fig. 4, the metal plug 98 is disposed in the top of the cylindrical portion, and below the same there is a felt plug 99 supported upon a supporting screen 100. Preferably, but not necessarily, immediately below the apertured metal plug 98 there is disposed the disc or impervious member 102 which is placed on top of the felt. This member 102 is preferably of linoleum, oiled silk or cork, but a metal disc may be used. Its function is, generally, to assist the pressure in compressing the felt plug 99 to decrease the flow of oil therethrough when the conduit is under pressure. In general, the effective volume of the various dose measuring chambers is graduated or calibrated to hold the exact quantity of oil required by the corresponding bearings.

Additional restrictions to flow may be provided, as shown by the two apertured discs 103 in the middle bearing in the group at the left of Fig. 4, and by the single apertured disc 104 in the third unit of the group of three at the left of Fig. 4.

Instead of a screen, such as 100, at the bottom of the cylindrical chamber, any other suitable rigid member may be employed, as, for example, the apertured washer 105 shown in Fig. 5.

In the unit shown in Fig. 5, the vertical leg 106 has the conical chamber 107 supplemented by the cup-shaped fitting 108 which is threaded into a socket formed in the vertical leg 106 for defining the extent of the measuring chamber. The cup 108 is introduced through an opening normally closed by the plug 109.

The impervious member 102 lies on the felt plug 110 and the felt plug is supported upon the apertured washer 105 which fits relatively closely in the bottom of the recess.

By providing cups of varying sizes, such as 108, the amount of oil which is trapped in the measuring chamber formed by the cup 108 and the portion 107 above the same and which is to be distributed to the corresponding bearings may be controlled.

The provision of the felt plug, the resistance to flow of which is increased by pressure thereupon, is desirable. Since the bearings of the car may have different resistances to flow, this compensation is desirable and is intended to cause the discharge of all of the measuring chambers in approximately the same length of time. The resistance at each chamber is calibrated to be inversely proportional to the amount of oil to be discharged by that measuring chamber with the same object in view. This mode of operation is to be observed in each of the modifications herein shown.

In the modified form of measuring chamber shown in Figs. 16 and 17, the T-shaped body 112 has horizontal inlet and outlet portions 113 and 114 suitably connected by well known couplings to the pieces of tubing 115 and 116 forming a part of the distribution conduit. The vertical leg 117 has an outlet opening 118, the body of said leg 117 extending upwardly as an annular rim 119 projecting above the bottom wall of the horizontal legs.

The measuring chamber 120 has its opening disposed above or substantially even with the upper wall of the pipe or tube connections 115 and 116 and a dome or chamber 122 is formed in a plug 123 above the chamber 120. The conduits 115 and 116 may be much smaller in diameter if desired. Oil flowing in through the pipe 115 flows through the fitting, it rises above the edge of the measuring chamber 120 and displaces the air therefrom, filling the chamber 120 by gravity, and any air which is not carried off by the flowing oil may be trapped in the dome 122. After the solid column of oil has passed and air pressure follows the same, the lubricant which has been trapped in the dose measuring chamber 120 is driven down through the felt plug 124 and through the flow restricting washers 125, of which there may be a suitable number. These washers 125 perform a dual function, first, of filling a certain part of the space of the recess in which they are placed, and second, of affording a corresponding restriction. That is to say, they have a differential action by displacing a certain amount of oil and interposing a greater resistance to the remaining amount.

In the modification shown in Figs. 16 and 17, oil may flow from the pipe 115 to the pipe 116, or vice versa, around the annular flange 119 without spilling over into the measuring chamber 120. For this reason in this modification traps between adjacent lubricating units, for trapping the oil draining from the walls of the conduit, are not essential.

A very convenient way to arrange the system is to provide measuring chambers all identical in size and, instead of the felt plug, to provide metal plugs such as shown in Figs. 18 and 19, these plugs, such as 126 and 127, being made in different lengths and having stamped on their ends a number corresponding to the number of drops which the measuring chamber will deliver at each operation when fitted with such plug. For instance, the plug 126, which may be the longest plug, may be made to leave in the measuring chamber a volumetric capacity for only one drop of oil, and the size of this plug is such, with relation to the diameter of the chamber, as will permit a certain rate of flow through the outlet. The next size plug, or No. 2 plug, is just long enough to leave a capacity for two drops of oil and will permit a rate of flow to deliver its charge at the same time, that is, a rate of flow double that of No. 1 plug. No. 3 plug will be of a length to permit three drops of oil to be retained in the chamber and it will discharge three times as fast as plug No. 1. The measuring chambers, if desired, may be made in two or more sizes; for instance, a small size adapted to contain from one to four drops of oil, and a second size adapted to contain from five to ten drops of oil, and so on.

As shown in Figs. 10 to 13, the felt plug and the impervious member and the support for the felt plug may all be assembled in a capsule, such as shown in Figs. 10 and 11 in one form. In this form there is a sheet metal cup 128 having imperforated side walls and having a perforated bottom wall 129.

The felt plug 130 is contained within the cup and the impervious member 132 lies on top of the felt plug, said impervious member being retained by the beaded upper edge 133 of the cup.

In the modification shown in Figs. 12 and 13, the unit is formed of a cylinder 134 having an inturned flange 135 for retaining the impervious member 132 upon the felt plug 130. A perforated supporting plate 136 is held in place by beading in the lower edge 137. Such resistance unit may be manufactured separately and seated in the bores of the lubricating units.

In Fig. 9 we have shown the manner in which oil may be delivered to bearings located above or below the run of the distribution conduit 7. For the bearing 138, located above the run of the pipe line system, we provide a U-shaped connection 139 connected by a T 140 to the run of the pipe line system, the longer vertical leg 142 being connected to a unit 143 which is threaded into a threaded socket at the bottom of the bearing 138, and in the unit 143 an assembled capsule unit, such as that shown in Fig. 10 or in Fig. 12, may be employed, in that instance the impervious member 132 being disposed downwardly and serving as a check valve to prevent the draining of oil from the felt plug or oil above the same back into the U-shaped portion 139.

At the left of Fig. 9, we have shown a unit 145 for a bearing disposed below the run of the pipe line system. In this case a reducing T coupling 146 is provided, one leg being connected to the tubing 147, which forms a part of the pipe line system, this tube being connected to the outer tube 148, which tube is connected to one leg of the T unit 146 at its upper end and at its lower end is coupled to the lubricating unit 145.

The tubing 149 which is coupled to the opposite end of the T 146, is extended down, as indicated at 150, to a point just above the apertured washer or plug 152. The space between the end of the pipe 150 and the felt plug forms the measuring chamber, as, in the normal course of distribution, the column or charge of oil is passed from the pipe 7 past the T 140, some of the same being driven up to the unit 144 and into the bearing 138 and the remainder being driven through the tube 147, thence down between the pipes 148 and 149, the oil being driven by the air pressure up through the lower end 150 of the pipe 149 until the air arrives at the bottom of the pipe 149, namely, at the end 150, and then passes on up, leaving a measured charge of oil in the unit 145. The air pressure then slowly forces the measured charge through the restriction in the unit 145, which restriction may be of any of the forms heretofore disclosed.

*General operation of the system*

The reservoir chamber 14 is filled preferably to a level below the return valve, although this is immaterial. The chamber 14 is vented to atmosphere to permit the escape of gas therefrom, this vent not being shown but being formed in any suitable manner. Due to the head of oil in the chamber 14, and due to the fact that the ball valve 46 drops by gravity against the pin 47, this ball valve not being absolutely air tight and permitting any pressure contained within the tubular member 24 slowly to leak away, oil will flow into the inlet connection 40 past the ball valve 43 and will rise in the chamber 15 to the level A.

Here, due to the air trapped above the opening 33, the liquid will not appreciably rise in the chamber 15, air being trapped above the same. The liquid will, however, rise in the tubular member 24 to the height corresponding to that in the chamber 14.

If air is supplied to the nipple 45, the usual tire filling hose may be applied to this nipple and held thereto for a short period of time long enough to permit the chamber 15 to be charged with compressed air at a pressure as high as 100 pounds, if desired. The hose being removed, the ball valve 46 will be flipped to its seat by the action of the escaping air, tending thereby to retain a charge of trapped air in the chamber 15. The ball valve 43 will also be driven to its seat and, due to the viscosity of the oil in contact with the same, this will be substantially tight.

The pressure of the charge of air contained in the top of the chamber 15 will then force the liquid from the level A down to the level B, this charge of liquid between those levels being driven out past the check valve 50 and into the distributing conduit 7. As soon as the level has dropped to the line B, air will follow the charge of oil and a detached body of oil will be driven through the pipe line system towards the return valve 65.

As the oil passes through the various lubricating units, such as 8—8 shown in Fig. 23 or any of the forms herein disclosed, the pressure of the oil will tend to compress the felt plugs that retard outward flow.

At the same time, the body of oil passing over the dose measuring chambers, such as 85 or 93, 96, 97 or 107 and 108, or the other forms herein shown, will leave a definite volume of oil held by gravity in the recesses provided for retaining the same.

As above explained, it is intended that the resistance to flow shall be inversely proportional to the amount measured out, so that all doses of oil will be discharged in approximately the same time. When the column of oil which constitutes the remainder of the charge reaches the return valve 65, the oil will flow past the ball valve 73 and, due to the friction of low, the velocity of the column of oil will be relatively slow until the latter part of the column approaches the ball valve 73, whereupon the movement will become very rapid and thereupon the ball 73 will be driven into the bore 76 and will prevent further outflow except at a very slow rate. The air pressure is then trapped in the distributing conduit upon the oil contained in the various dose measuring chambers, forcing the oil from these chambers through the resistance between the chambers and the outlets and permitting emptying of these chambers under pressure all at approximately the same time. When the air pressure has dropped to a suitable low value in the distributing conduit, the ball valve 73 will again be brought back to its seat 72. It will be understood that a ball valve, in general, is not absolutely fluid tight, and a small leakage past the valve 73 may occur permitting the pressure in the pipe line system to drop to atmospheric. It will be understood that the ball 46 in the nipple 45 also permits leakage and, due to leakage, the pressure in the chamber 15 and in the tubular member 24 will drop to a value which will permit oil again to flow in through the inlet connection 40 to recharge the charge measuring chamber 15 with the proper charge of oil.

Where the alternative air supply 3 is employed, that is, pressure is taken from the engine cylinders or from another source of compressed air which may be provided in the automobile, as in the case of air brakes or in stationary machinery by a suitable supply of compressed air, the button 62 is pulled to the left, tensioning the spring 57 and opening the valve 55. The valve will remain open a predetermined period, depending upon the rate of closing allowed by the timing element 63—64. This will admit air to the tubular member 24, as, for instance, gases from the cylinder on compression and explosion, forcing the ball valve 46 to its seat 48 in the nipple 45 and then proceeding to charge the chamber 15 with compressed gas, as previously described. The operation thereafter is the same as above set forth.

*Modified form of oil supply and charge measuring chamber*

In Figs. 6, 7, 8, 14 and 15, we have shown a modified form of oil supply and charge measuring chamber which may be employed in connection with the main lubricating system of the engine of an automobile or the like.

In this form the filler connection 153, which may serve also as a breather for the crank case, is provided with a cap member 154. This filler neck 153 has an auxiliary chamber 155 formed alongside the same and adapted to be filled at the same time that the crank case is supplied with oil. This chamber 155 is closed at the bottom, but communicates through a lateral connection 156, which is adjustable as to position, with a separate charge measuring chamber 157.

In this case the chamber 157 has a tubular inlet connection 158 of the type shown in Fig. 15, connected by a nut 159 on the inside of the chamber 155. A serrated coupling is provided, that is a serrated boss, on both the chamber 155 and the charge measuring chamber 157 for adjustment in any angular position desired. The construction of the charge measuring chamber is substantially as described in connection with Fig. 1, this comprising a tubular housing having an air supply nipple 160 at the top like the nipple 45 described in connection with Fig. 1 and having a suitable ball check valve as herein shown and explained. The bottom outlet connection 162 is of the same type disclosed in connection with Fig. 1, the nipple 160 communicating at the upper end of a tubular member on the inside of the chamber 157, all as disclosed in connection with Fig. 1, the sole difference being that instead of the chamber 15 in Figs. 6 to 8 being internal with respect to its oil supply chamber, in this case 155, it is external. Otherwise, the construction and operation are the same.

In connection with this form of oil supply, a modified form of return valve 164, which is shown in detail in Fig. 21, is employed.

In Figs. 14 and 15, we have shown the manner in which the measuring chamber 157, shown in Figs. 6, 7 and 8, may be provided with means for supplying compressed gas from the engine cylinders to perform the displacing function, but also to perform, preliminarily, a heating up function for the pipe line system. In this case, a three position clutch valve 165 is interposed between the pipe 53 leading to the engine cylinder and the inside of the chamber 157, and also between the pipe 53 leading to the engine cylinder and the distribution conduit 7.

The inlet connection 158 has the check valve 166 which is normally held off of its seat by the spring 167 and which valve is adapted to be flipped to its seat by the application of pressure to oil in said chamber, when pressure is applied thereto. The plug 165 is normally held in position by a spring 168, shown in Fig. 14. The plug 169 of the valve 165 has a single through passageway 170, as shown in Fig. 15, and this is adapted to assume three different positions, namely, the full line position shown in Fig. 15, and the two dotted line positions shown therein. The valve plug 169 is connected to a pulley or wheel 172 to which the cord or cable 58, explained in connection with Fig. 1, is suitably connected. The timing element 61, shown in Fig. 1, is adapted to be connected to the cord 58, shown in Fig. 14. The seat or housing of the plug shown at 173 has a recess 174 to provide communication with the transverse passageway 175 in two different positions at 90 degrees to each other. This valve housing also has an outlet 176 into the chamber 157 and another outlet at right angles thereto into the passageway 177 leading down to the pipe line system 7 below the outlet ball check valve 50.

The body of the plug 169 is provided with three seats or recesses in which a spring pressed ball held in the boss 178 is adapted to engage. The operation of this form of the device is as follows:—The handle 62 of the timing element 61 is pulled out and the valve plug member 169 is rotated until the passageway 175 is in the vertical dotted line position. Hot gas then passes through the passageway 177 and through the pipe line system, thereby tending to heat up the conduit and assist in lowering the viscosity of the oil flowing through the same.

No oil is discharged from the chamber 157 by this operation, and such oil as may be trapped in the various parts of the system may be driven forward by the same, the return valve unit shown in Fig. 21 being preferably employed in this connection. As the timing element 61 permits the spring 168 to rotate the valve, it will snap from the vertical position into the horizontal position, thereupon permitting hot compressed gas to be driven into the chamber 157, closing the check valve 166 and holding the check valve 179 in the nipple 160 to seat, and discharging oil past the discharge check valve 50 into the pipe line system, whereupon the same operation heretofore described, in distributing the oil, and forcing the same into the bearings occurs. The timing element then permits the valve to be rotated back into the full line position shown in Fig. 15 where communication with the pipe 53 is cut off. The ball valve 179 slowly leaks away the pressure in the chamber 157 and refilling of the same occurs. The filling of the chamber 157 is controlled by the lower end of the pipe 182, which is a continuation of the nipple 160. The valve 179 in this case is held to seat by a spring, but it is understood that the valve 179 is not absolutely fluid tight.

*Modified form of return valve*

The modified form of return valve 164, which is preferably used in connection with the supply and charge measuring chambers shown in Figs. 6, 7 and 8, and in 14 and 15, is shown in Fig. 21. The return end 9 of the pipe line system comes back and passes through the wall of the filler neck 153 into a closed chamber 184 held on the inside of said filler neck 153.

The pipe line is connected to a stud 185, which is held by a nut 186 on the inside of the chamber 184, this nut having an opening to permit the discharge of the contents of the end of the pipe line into said chamber 184. The chamber has two outlet openings, one at the bottom as indicated at 187, controlled by the valve 188 held away from its seat by a light spring 189 and adaped to be brought to its seat quickly when wet with oil by a slight pressure in the chamber 184.

The other valve 190 is placed considerably higher in the chamber 184 and it is mounted in a plug member 192 providing a valve seat for the valve 193 which is held away from its seat by a stiffer spring 194, but also adapted to be overcome by internal pressure when wet with oil. The position of the valve 193 is definitely maintained by the spring 194 by having the stem member 195 strike a definite stop, in this case the wall of the chamber. The stem 195 has an external button 196 by which the valve may be opened manually when desired.

The operation of this return valve is as follows:—When oil forming the remainder of the charge and air ahead of it is driven towards the chamber 184, the air may pass freely through either of the valves 188 or 193 and escape. As soon as oil is discharged into the chamber 184 it will gravitate to the bottom and wet the valve 188, thereby causing the same to close due to any internal pressure in the chamber 184, such as is caused by the advance of air and oil due to the propulsion thereof by the charge of oil driven from the charge measuring chamber.

When the remainder of the charge of oil arrives in the chamber 184, it will tend to raise the level in said chamber 184, and when the level rises to the valve 193, said valve will also be closed and will be held to its seat by internal pressure, thereby, in conjunction with the valve 188 which has previously closed, will hold the oil in the chamber 184 from escape and also prevent the escape of air at this point until the pressure drops to a relatively low value, whereupon the valve 193 will be quickly opened, releasing the internal pressure in the chamber 184 and releasing the pressure in the pipe line system and also allowing the valve 188 to be opened and oil to drain out of the bottom of the chamber 184.

This form of return valve operates as a quick release valve for pressure in the pipe line system when the pressure is dropped to a predetermined value.

We shall now describe, in connection with Figures 20 and 22, a form of charge measuring chamber and manually operated air supply device comprising the foot operated pump 197. We provide a chamber member 198 which is connected between a suitable oil pump 199 which may be the engine oil pump taking its oil through the main 200 from the crank case and delivering the same to the delivery pipe 202 to the bearings of the engine. This pipe 202 has a branch 203 leading to the inside of the chamber member 198 to the charge measuring chamber 204 through a check valve 205, which has a spring 206 stiff enough normally to hold a valve to seat, but allowing pressure from the pump 199 to fill the chamber 204 without appreciable difficulty and transmitting the pressure through the pipe 207 to the usual oil gauge 208, which may be placed upon the dash of the vehicle as usual.

The chamber 204 has an outlet valve 209 which is held to seat by a spring 210 sufficiently stiff to prevent the discharge of oil from the chamber 204 by the pressure of the pump 199 in all normal operation. The tension of the spring 210 may be adjusted by the plug 211. The valve 209 leads to the pipe line 7 through the passageway 212. The foot operated pump 197 has a cylinder 213 coupled directly to the chamber member 198 and supported thereby. This cylinder has an inlet check valve 214 by which air is drawn into the cylinder 215. The lower end of the cylinder is closed by a poppet check valve 216 normally held to its seat by a spring 217. A plunger 218 formed as a tubular member with a cap 219 at its upper end, covered by the rubber or other resilient button 220, is urged outwardly by the compression spring 222, which spring is of considerable strength. The plunger 218 is tubular. It carries at its lower end the cup-leather 223 and a flanged threaded ring 224, which holds the head 225 formed on the upper end of the stem 226 of the poppet valve 216. By this means the spring 222 causes the plunger to pull the stem 226 to hold the valve 216 tightly closed.

The spring 217 which normally holds the poppet check valve 216 closed, is formed as a tongue struck out of a disc, the edges of which are seated between the end of the cylinder and a shoulder in the casing 198. At the uppermost part of the chamber 204 an air bleed opening 227 extends upwardly through a restriction formed by a pin 228 which substantially fills the bore in which it is seated.

At its upper end the bleeder connection continues as a tube 229, communicating with the upper end of the cylinder at 230. A felt washer 232 is disposed about the hollow plunger 218 at the upper end of the cylinder, and it serves to lubricate said plunger. This felt washer may be held in any suitable manner in the upper end of the cylinder. It can now be seen that any air which may be trapped in the chamber 204 will leak out of the bleeder passageway past the restriction of the pin 228 and be discharged into the upper end of the cylinder 215, from which it may escape through the clearance between the plunger and the upper end of the cylinder and also past the inlet check valve 214 which is held adjacent its seat only by gravity and therefore permits a small amount of leakage readily.

In the operation of the system shown in Fig. 20, the pipe line or distribution conduit 7 and the metering unit may be the same as previously described, and the return valve is preferably of the type shown in Fig. 21 for discharging the excess of lubricant forming the charge back into the crank case of the engine.

In normal operation of the engine, the lubricating pump 199 draws oil from the sump in the crank case and delivers the same through the delivery pipe 202 to the various bearings of the engine. The branch 203 delivers oil into the chamber 204 and indicates the normal working pressure of the lubricating system on the gauge or head 208. The check valve 205, which is located between the pipe 203 and the chamber 204 has sufficient leakage to permit the pressure in the head 204 to follow fairly closely the pressure in the pipe 202 and the remainder of the lubricating system of the engine.

The pressure which the pump 199 will deliver to the engine lubricating system is less than the maximum for which the gauge or head 208 has been designed.

When it is desired to operate the chassis lubricating system, the operator depresses the plunger 218, the cup-leather piston forcing air past the check valve 216 into the top of the chamber 204, which is filled with liquid from the lubricating system of the engine. Repeated strokes are made, air being drawn in through the inlet check valve 214 and discharged past the discharge check valve 216 into the chamber 204. The operation is repeated until the pressure builds up to a pressure greater than the pressure of the lubricating system of the engine, whereupon the check valve 205 will be held closed, and upon continuing the operation of the plunger, the head 208 will indicate a higher than normal pressure in the chamber 204. The oil is then forced past the loaded valve 209 into the pipe line system where the operation heretofore described, in distributing oil to the lubricating unit, trapping of the air in the distribution conduit, and application of pressure to the measuring chambers to force oil therefrom into the bearings, is carried out.

After the lubricating operation has been completed, the plunger 218 is allowed to assume the position shown in Fig. 20, and the air which is contained in the chamber 204 then slowly escapes through the bleeder passageway 227 past the restricting pin 228 and passageway 230 into the pump cylinder 215.

Oil will tend to flow out of the bleeder passageway, but, because of the restriction afforded by the pin and the remainder of the bleeder passageway, substantially no oil will be discharged, and such oil as is discharged will reach the felt washer 232 and lubricate the plunger and cylinder. Any oil which is trapped in the cylinder 215 may be discharged upon the first operating stroke of the plunger 218. An accumulating air chamber may be provided in connection with the device shown in Fig. 20, so that a sufficiently large charge of compressed air will follow the charge of oil which is metered out by the chamber 204.

We do not intend to be limited to the details of construction herein shown. We believe it is broadly new to provide the charge measuring chamber which is emptied by pneumatic pressure.

We claim:—

1. In a lubricating system, the combination with bearings to be lubricated of oil supply means, a charge measuring chamber having an inlet check valve from the oil supply means, said charge measuring chamber having a liquid discharge passageway, a loaded check valve controlling said discharge passageway, a source of gas pressure, a valve for admitting and retaining compressed gas in the charge measuring chamber, a conduit leading from said discharge passageway to said bearings and back to the supply chamber, dose measuring chambers for the bearings communicating with the conduit, and means between the return end of the conduit and the oil supply means for retaining gas pressure in the conduit to force liquid from the dose measuring chambers into the bearings.

2. In a lubricating system, the combination with bearings to be lubricated of oil supply means, a charge measuring chamber having an inlet check valve from the supply means, an oil discharge passageway, a loaded check valve controlling said discharge passageway, a source of gas pressure, a valve for admitting and retaining compressed gas in the charge measuring chamber, the gas forcing liquid from the charge measuring chamber past said loaded discharge check valve, a conduit from said discharge passageway leading to the said bearings and back to the supply means, dose measuring chambers for the bearings communicating at their tops with the conduit, flow restricting means between the measuring chambers and the bearings, and a valve between the return end of the conduit and the supply means for retaining gas pressure in the conduit to force oil from the dose measuring chambers into the bearings.

3. In a lubricating system, the combination with bearings to be lubricated, of a conduit leading in succession to the bearings, means for introducing a charge of lubricant into the conduit, a compressed gas supply connection for said conduit, dose measuring chambers for the bearings communicating with the conduit, means at each end of the conduit for retaining gas under pressure, and means operable upon the elapse of a certain time interval to release the gas under pressure from said conduit.

4. In a lubricating system, the combination with bearings to be lubricated, of a conduit leading in succession to the bearings, means for introducing a charge of lubricant into the conduit, a compressed gas supply connection for said conduit, a check valve for preventing the escape of the contents of the conduit from the inlet end, dose measuring chambers for the bearings, said dose measuring chambers communicating with the conduit, means permitting the escape of excess lubricant from the conduit, said means retaining the gas under pressure in the conduit, and means for releasing the gas under pressure from said conduit.

5. In a lubricating system, the combination with bearings to be lubricated, of a conduit leading in succession to points adjacent to the bearings and having branches leading therefrom to the bearings, pneumatic displacement means for introducing a charge of lubricant into the conduit, a source of compressed gas, a compressed gas supply connection from said source to said means, a time controlled valve governing said connection, and flow restrictions between the conduit and the bearings.

6. In a lubricating system, the combination with bearings to be lubricated, of a conduit leading in succession to the bearings, pneumatic displacement means for introducing a charge of lubricant into the conduit, a source of compressed air, a compressed gas supply connection between said source and said means for propelling the charge of lubricant through the conduit, dose measuring chambers for the bearings communicating with the conduit, and liquid flow restricting means between the dose measuring chambers and the bearings.

7. In a lubricating system, the combination with bearings to be lubricated, of a conduit leading in succession to the bearings, pneumatic displacement means for introducing a charge of lubricant into the conduit, a source of compressed gas, a compressed gas supply connection between said source and said means for propelling the charge of lubricant through the conduit, dose measuring chambers for the bearings communicating with the conduit, and liquid flow restricting means between the dose measuring chambers and the bearings, means at each end of the conduit for retaining gas under pressure, and means subsequently operable for releasing the gas under pressure from said conduit.

8. In a lubricating system, the combination with bearings to be lubricated, of a conduit leading in succession to the bearings, pneumatic displacement means for introducing a charge of lubricant into the conduit, a source of pneumatic pressure for said means, dose measuring chambers for the bearings, said chambers communicating with the conduit at their tops, means permitting the escape of excess lubricant from the conduit, but retaining the pneumatic pressure in the conduit upon said dose measuring chambers, and subsequently operating means for releasing the gas under pressure from said conduit.

9. In combination a plurality of lubricating units having measuring chambers of equal capacity, a pipe joining the same, pneumatically operated means for conveying lubricant to the units to fill the measuring chambers and for thereafter applying pneumatic pressure to the lubricant in said measuring chambers, said chambers having outlets to bearings and having displacing members disposed in said chambers for controlling the effective volume of these chambers, said members providing restrictions inversely proportional to the effective volumes of the corresponding chambers.

10. In combination, an oil supply reservoir, a charge measuring chamber having an inlet check valve leading to the supply reservoir, said measuring chamber being adapted to be filled by gravity from the reservoir, an outlet for oil from the bottom of the chamber, a source of compressed air, a connection from the chamber to the source, a timing element controlling said connections, a distributing conduit leading from the outlet of the chamber to the various bearings to be lubricated, lubricating units located at the bearings, said units having measuring chambers adapted to be filled with lubricant from the charge propelled through the conduit.

11. In combination an oil supply reservoir, a charge measuring chamber, an inlet check valve for the chamber communicating with the reservoir, an outlet for oil from the bottom of the chamber, a source of compressed air, a connection from the source to the chamber, a distributing conduit leading to the various bearings, lubricating units at the bearings having measuring chambers adapted to be filled with lubricant from the charge of lubricant propelled to the conduit, a return valve permitting the delivery of lubricant from the conduit but retaining air pressure therein, and means for subsequently releasing the air under pressure from said conduit.

12. In a lubricating system, a pipe line having lubricating units for bearings to be lubricated, said units having measuring chambers adapted to be filled by gravity with lubricant, means for introducing a charge of lubricant and a following charge of compressed air into the conduit at one end, means at the other end of the conduit for permitting escape of the remainder of the charge of lubricant but trapping compressed air in the conduit, and means for subsequently releasing the air under pressure from said conduit.

13. In combination, a reservoir for lubricant, a measuring chamber having an inlet valve communicating with the reservoir, a compressed air supply connection for the chamber for introducing a charge of compressed air to discharge lubricant from the chamber, a liquid discharge connection for the chamber, a distributing conduit leading from the discharge connection to the bearings to be lubricated, lubricating units at the bearings connected with the distributing conduit, said conduit extending back to the oil supply reservoir, and a check valve between the return end of the conduit and the oil supply reservoir.

14. In combination, a source of oil supply, a charge measuring chamber, a circulatory distributing conduit, dose measuring chambers at each of the bearings communicating with the distributing conduit, means to supply lubricant and gas alternately to said conduit in such manner that the air drives the lubricant therethrough, and a gas trapping valve between the return end of the distributing conduit and the source of supply and operable upon a decrease in the pressure thereat to a predetermined value due to the escape of lubricant from the conduit, to permit escape of gas from the conduit.

15. In combination, a source of oil supply, a charge measuring chamber adapted to be filled with oil from said source, means for applying gas under pressure to said charge measuring chamber, means for releasing the gas from said chamber, a distributing conduit leading from said charge measuring chamber to each of the bearings and back to the source of oil supply, said charge of oil being discharged from said measuring chamber to said conduit by the gas under pressure, dose measuring chambers at each of the bearings communicating with the distributing conduit, and means for passing the excess of oil from said distributing conduit back to the source of oil supply and for retaining gas under pressure in said distributing conduit for an appreciable period and thereafter operative slowly to release gas from said conduit.

16. In a lubricating system, the combination with bearings to be lubricated, of a conduit leading in succession to the bearings, pneumatic displacement means for introducing a charge of lubricant into the conduit, compressed gas supply means for said pneumatic displacement introducing means, timing means for said compressed gas supply means operable to maintain pressure upon the lubricant in said displacement means for a predetermined length of time thereby to force the lubricant through said conduit, connections between said conduit and the bearings, and valve means to permit escape of gas from said conduit when the pressure therein has decreased to a predetermined valve due to the escape of lubricant from the conduit.

17. In a lubricating system, the combination with bearings to be lubricated, of a conduit leading in succession to points adjacent the bearings and having branches leading therefrom to the bearings, pneumatic displacement means for introducing a charge of lubricant into and forcing it through said conduit, a source of compressed gas, a supply connection from said source to said means, and a time controlled valve in said connection, said valve when open establishing communication between said source of compressed gas and said pneumatic displacement means and closing to cut off such communication after a predetermined time interval.

GEORGE R. ERICSON.
DENNIS McC. RAMSAY.